April 14, 1959 N. E. RISK 2,881,872
EMERGENCY AND PARKING BRAKE FOR TRACTORS
Filed Aug. 16, 1956
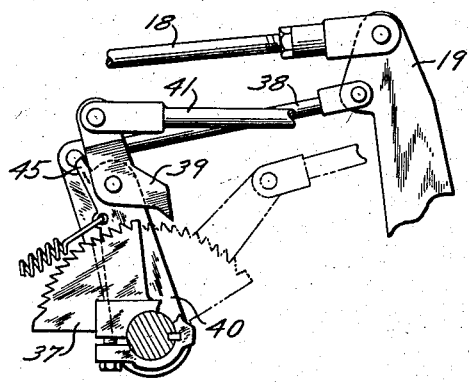
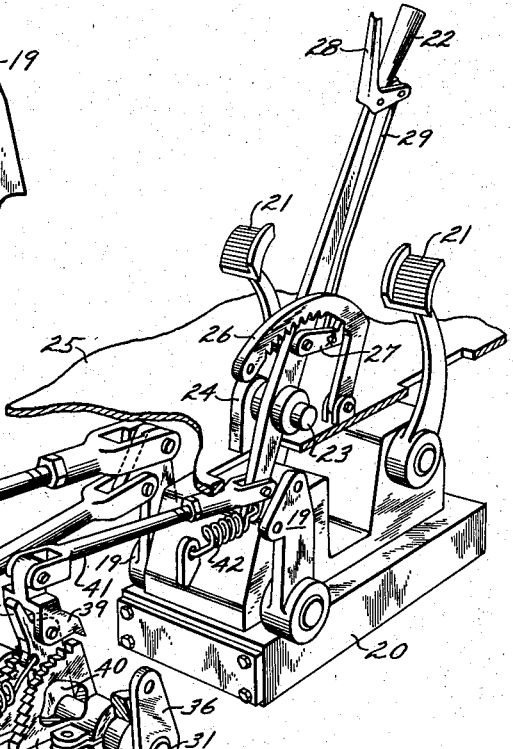
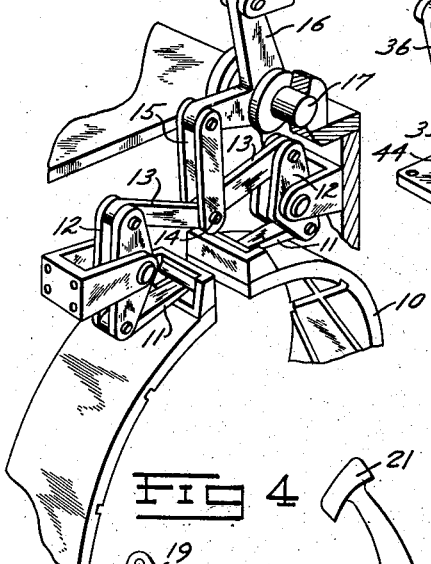
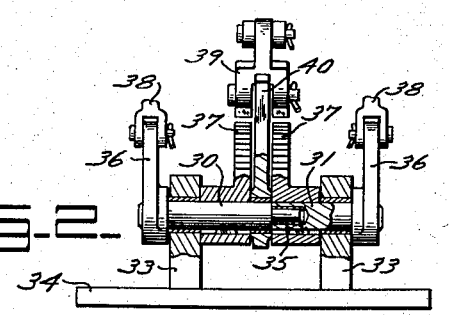
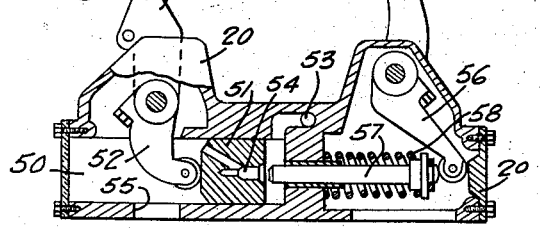
INVENTOR.
NORMAN E. RISK
BY
*Fryer and Johnson*
ATTORNEYS

United States Patent Office 2,881,872
Patented Apr. 14, 1959

2,881,872

EMERGENCY AND PARKING BRAKE FOR TRACTORS

Norman E. Risk, Peoria, Ill., assignor to Caterpillar Tractor Co., Peoria, Ill., a corporation of California Application August 16, 1956, Serial No. 604,385

5 Claims. (Cl. 188—106)

This invention relates to brakes for tractors, and particularly to an emergency and parking brake used in conjunction with a tractor braking system of a conventional kind.

It is common practice in track-type tractors and in some wheel tractors to steer by driving and also by braking. In other words, the drive from the engine to the two drive sprockets or wheels, as the case may be, is separate and includes two clutches and two brakes individually controllable to insure positive differential movement of the drive members on opposite sides of the tractor. In many tractors and most track-type tractors, these two brakes constitute the sole braking means as well as serving as an aid in steering. The brakes are usually pedal-actuated, and it has become common practice, particularly in large tractors, to employ a hydraulic booster in the linkage between each pedal and the brake controlled by it. These boosters have what is referred to as mechanical follow-through so that upon failure of the hydraulic fluid pressure the mechanical linkage is effective, upon depression of the pedal, to apply the brake.

When a large tractor is going down grade, and especially when it is drawing a heavy load, the mechanical advantage afforded by the pedal linkage without the aid of hydraulic pressure is often not sufficient to enable the operator to apply enough pressure to stop the tractor or even to retard its forward movement. This, of course, presents an extremely hazardous condition.

It is an object of the present invention to provide an emergency brake, also usable as a parking brake for use in connection with the two separate brakes of a tractor of the kind described and having greater mechanical advantage than the conventional brake pedals. Another object of the invention is to provide an emergency brake lever on a tractor which is normally not operatively connected to either of the tractor brakes but which may be employed to apply either or both of the brakes upon depression of either or both of their respective pedals.

Further and more specific objects and advantages of the invention and the manner in which it operates are made apparent in the following specification wherein reference is made to the accompanying drawings.

In the drawings:

Fig. 1 is a perspective view with parts broken away and some parts omitted illustrating the brake system of a conventional track-type tractor with which the emergency and parking brake of the present invention has been combined;

Fig. 2 is a central, vertical section through a ratchet and pawl system employed in connection with the new brake;

Fig. 3 is a fragmentary view in side elevation of the same ratchet and pawl system; and Fig. 4 is a central, vertical, longitudinal section through the hydraulic booster housing shown in Fig. 1 and illustrating the hydraulic and mechanical connection between a brake pedal and a part of the brake actuating linkage.

In Fig. 1 of the drawings, a brake band is illustrated at 10 which surrounds a brake drum (not shown) on one side of the final drive mechanism of a tractor. An identical brake band and linkage is disposed on the opposition side but is omitted from the drawing for the purpose of clarity. This brake band is applied by the pressure of fingers 11 disposed at the lower ends of two sets of pivoted levers 12. The upper ends of these levers are connected by a pair of pivoted toggle links 13 so that upon upward movement of these links at their central pivotal connection 14, the brake band is tightened about its drum.

This braking action is applied through linkage which comprises links 15 connecting the toggle to a bellcrank 16 on a pivotally mounted pin 17. A rod 18 connects one arm of the bellcrank to a lever 19 on a hydraulic booster housing 20. Also supported on the housing is a brake pedal 21. Depression of the brake pedal 21 swings the lever 19 toward the right, as viewed in Fig. 1, to apply the brake. This is accomplished through a hydraulic booster of a conventional type contained within the housing 20. Such a booster is shown in Fig. 4 where the housing 20 is illustrated as having a cylindrical cavity 50 with a floating piston 51 therein adapted to engage the lower end of a lever 52 fixed to the same shaft which supports the lever 19 in the brake linkage. Fluid under pressure from a source not shown constantly flows into the cylinder 15 through an inlet port 53 normally passing through a port 54 in the piston 51 and discharging back to the system through an opening 55 in the lower portion of the cylinder. When the brake pedal 21 is depressed, a lever 56 fixed to the same shaft that supports the brake pedal engages the end of a rod 57 normally urged to the right, as shown in Fig. 4, by a spring 58 and slides this rod toward the left. The end of the rod tends to close the port 54 in the piston 51 so that pressure is built up in the cylinder to urge the piston toward the left and hydraulically actuate the lever 19 in the brake linkage. Upon failure of fluid pressure, the leftward movement of the rod 57 comes into actual engagement with the end of piston 51, thus applying the brake mechanically. The parts just described are for the left-hand brake, and the right-hand brake parts, insofar as shown, are identical and bear the same reference characters.

The present invention provides a hand brake lever 22 pivotally mounted on a pin 23 in brackets, one of which is shown at 24, mounted on the floor plate 25 of the operator's station of the tractor. An arcuate ratchet 26 is disposed alongside the brake lever 22 for engagement by a pawl 27 pivoted to the brake lever and controlled by a hand lever 28, to which it is connected as by a rod 29. A spring (not shown) interposed between the hand lever 28 and the brake lever 22 normally urges the hand lever outwardly and urges the pawl 27 upwardly into engagement with the ratchet 26 so that upon applying the brake by swinging the lever 22 toward the left, as illustrated in Fig. 1, the pawl will engage the ratchet and hold the brake in its applied position. Release of the brake is accomplished by pressing the hand lever 28 toward the brake lever.

It is desirable that the brake lever 22 be employed for applying the brakes of the tractor only upon the condition that either or both of the foot brakes have been applied and that it be entirely free of any connection with the brakes when its use is not required. To this end a pair of coaxial, independently rotatable shafts 30 and 31 (see also Fig. 2) are mounted in brackets 33 on a plate 34 suitably secured to the tractor at a point rearwardly of the booster housing 20. The shafts are preferably pivoted at their inner ends as indicated at 35 in Fig. 2. Each of the shafts 30 and 31 has a lever 36 at its outer end and an arcuate ratchet 37 adjacent its inner end. Each of the levers 36 is connected by a rod 38 to one of the levers 19 so that upon application of either or both brakes by depression of the foot pedals 21, the ratchets 37 are swung from the normal position shown to a position illustrated in dotted lines in Fig. 3. In the latter position, the ratchets 37 underlie a pawl 39 pivotally supported on a lever 40, which is rotatably mounted on the shaft 30 between the two ratchets 37 and is of sufficient width to engage them both. The pawl 39 is connected by a rod 41 to a point adjacent the lower end of the brake lever 22, and this lever is urged toward its release position as by a spring shown at 42.

In operation, swinging the lever 22 toward its braking position has no effect unless one of the pedals 21 has been depressed. However, if either or both of the pedals has been depressed, the ratchets 37 are swung to the position referred to and underlie the pawl 39. With this position of the parts, swinging of the lever 22 toward its braking position causes the pawl 39 to engage the ratchets 37, and through this engagement, either or both of the shafts 30 and 31 is rocked with the full mechanical advantage of the leverage of the long brake lever 22. Through the levers 36 and 38 the brake-applying linkage is actuated. A spring 44, shown in Fig. 1, tends to retract the lever 40, which carries the pawl 39 and a finger 45 at the upper end of this lever prevents the pawl from swinging rearwardly beyond a predetermined position. This finger forms a stop which enables the lever 22 to be employed to forcibly retract the lever 40, thus augmenting the force of the spring 44 should the action of the lever 40 become stiff due to dirt or rust which might accumulate in its exposed position.

With this invention the operator of a tractor which is going downhill, when the engine has stalled, or for other reasons the source of hydraulic fluid under pressure has failed, can easily bring the tractor to a stop by depressing one or both of the brake pedals and applying the brakes through the long hand lever 22. It is also a simple matter to set the brakes when the tractor is parked by the same method.

It is also contemplated that one or the other of the ratchets 37 and its associated linkage could be omitted so that only one brake of the tractor would be employed for emergency and parking. Such an arrangement, however, tends to create uneven wear on the brake bands and is not as safe for emergencies where the operator, with the structure shown, can employ either or both pedals to enable the emergency brake lever to function.

I claim:

1. In a vehicle brake system which includes two independently operable brakes with separate actuating members, a third actuating member adapted to be connected with at least one of the brakes and means connected to at least one of the first actuating members and movable upon actuation of said first actuating member to effect said connection.

2. In a vehicle brake system for a tractor or the like which includes two brakes independently actuated by separate foot pedals, a hand lever, normally disconnected means to connect the hand lever to the brakes for applying them, and means connected with and movable upon actuation of a foot pedal to complete the connection.

3. In a vehicle brake system for a tractor or the like which includes two brakes independently actuated by separate foot pedals, a hand lever, normally disconnected means to connect the hand lever to the brakes for applying them, and means connected with and movable upon actuation of either foot pedal to complete the connection.

4. In a vehicle brake system for a tractor or the like which includes two brakes, two brake pedals and linkage connecting each pedal with one of the brakes, an emergency hand lever, means to connect the hand lever to said linkage for applying the brakes by hand, said means including a ratchet and pawl, means supporting the ratchet in a position where it cannot be engaged by the pawl, and means operable upon actuation of at least one brake pedal to move the ratchet to a position for engagement by the pawl.

5. In a vehicle brake system for a tractor or the like which includes two brakes, two brake pedals and linkage connecting each pedal with one of the brakes, an emergency hand lever, means to connect the hand lever to both pedal linkages for applying the brakes by hand, said means including a ratchet and pawl associated with each linkage, means supporting the ratchets where they cannot be engaged by the pawl, and means operable upon operation of each brake pedal to move one of the ratchets to a position for engagement by the pawl.

References Cited in the file of this patent

UNITED STATES PATENTS

| | | |
|---|---|---|
| 2,539,538 | Hayes | Jan. 30, 1951 |
| 2,725,945 | Beaudoux | Dec. 6, 1955 |